US012665840B2

(12) United States Patent
Filsfils et al.

(10) Patent No.: US 12,665,840 B2
(45) Date of Patent: Jun. 23, 2026

(54) NETWORK OBSERVABILITY SOLUTION FOR DETECTING ROUTING ANOMALIES

(71) Applicant: Cisco Technology, Inc., San Jose, CA (US)

(72) Inventors: Clarence Filsfils, Brussels (BE); Rakesh Gandhi, Stittsville (CA); Ahmed Mohamed Ahmed Abdelsalam, L'Aquila (IT); Pablo Camarillo Garvía, Madrid (ES); Sonia Ben Ayed, Vanves (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/522,568

(22) Filed: Nov. 29, 2023

(65) Prior Publication Data

US 2025/0175414 A1      May 29, 2025

(51) Int. Cl.
    *H04L 45/28*     (2022.01)
    *H04L 41/0677*     (2022.01)
    *H04L 43/10*     (2022.01)

(52) U.S. Cl.
    CPC .......... *H04L 45/28* (2013.01); *H04L 41/0677* (2013.01); *H04L 43/10* (2013.01)

(58) Field of Classification Search
    CPC ...... H04L 45/28; H04L 41/0677; H04L 43/10
    See application file for complete search history.

(56) References Cited

U.S. PATENT DOCUMENTS

| | | | |
|---|---|---|---|
| 2014/0192630 A1 | 7/2014 | Vaidya et al. | |
| 2016/0020941 A1* | 1/2016 | Asati ................... | H04L 41/0659 |
| | | | 370/228 |
| 2018/0351787 A1 | 12/2018 | Boyapati et al. | |
| 2019/0319882 A1* | 10/2019 | Yuan ....................... | H04L 47/28 |
| 2019/0349290 A1* | 11/2019 | Pignataro ................ | H04L 45/26 |
| 2021/0160279 A1* | 5/2021 | Watts ................... | H04L 63/1475 |
| 2022/0191130 A1* | 6/2022 | Nainar .................... | H04L 45/20 |
| 2022/0303208 A1 | 9/2022 | Rahman et al. | |
| 2023/0412498 A1* | 12/2023 | Means .................... | H04L 45/70 |

FOREIGN PATENT DOCUMENTS

| | | |
|---|---|---|
| WO | 2021169516 A1 | 9/2021 |
| WO | 2023091380 A1 | 5/2023 |

OTHER PUBLICATIONS

Filsfils C., et al., "Path Tracing in SRv6 Networks", Workgroup: SPRING, Intended Status: Standards Track, Oct. 23, 2023, 17 Pages.

* cited by examiner

*Primary Examiner* — Kamal M Hossain
(74) *Attorney, Agent, or Firm* — Lee & Hayes, P.C.

(57)           ABSTRACT

In one implementation, a method is disclosed comprising: identifying, based on path tracing probes sent through a network, data plane forwarding paths between nodes in the network; determining, based on topology data for the network, expected protocol-based paths between the nodes; detecting, based on a comparison of the data plane forwarding paths and the expected protocol-based paths between the nodes, a routing anomaly in the network when the data plane forwarding paths and the expected protocol-based paths differ; and causing performance of a mitigation action in the network with respect to the routing anomaly.

20 Claims, 11 Drawing Sheets

SaaS PROVIDER
308

ISP 3
306d

ISP 2
306b

ISP 1
306a

MPLS
306c

REGIONAL
HUB
304

Int 1

Int 2

Int 3

110

REMOTE
SITE
302

310

NETWORK OBSERVABILITY SOLUTION FOR DETECTING ROUTING ANOMALIES

TECHNICAL FIELD

The present disclosure relates generally to computer systems, and, more particularly, to a network observability solution for detecting routing anomalies.

BACKGROUND

The current landscape of network management is fraught with challenges that stem from the complexity and dynamism inherent in modern digital communication systems. As networks have grown in size and intricacy, the efficacy of traditional network management and monitoring tools has been increasingly degraded. Among the critical issues that network administrators face, blackholing and incorrect forwarding paths stand out due to their detrimental impact on network performance and reliability.

The current methodologies employed for monitoring network paths primarily rely on periodic network health checks, such as ping sweeps and traceroute mapping. These techniques send probe packets through the network to discover the topology and identify the routes that data packets take. However, these methods are predominantly manual, sporadic, and offer only a snapshot of the network at a given moment. Such approaches are inherently reactive and fail to deliver continuous visibility.

Conventional network observability solutions often rely on end-to-end traffic analysis and threshold-based alerts. Network monitoring systems flag issues when the traffic volume dips below a certain level or when responses from a particular segment of the network cease unexpectedly. However, such systems are typically unable to detect and/or pinpoint a blackhole and/or its exact location or cause, which is crucial for quick resolution. Furthermore, post-facto analysis of traffic forwarding accuracy is largely dependent on the accuracy of routing tables which may not reflect real-time network dynamics, which is largely insufficient. In short, there are no existing reliable mechanisms for detection of the black holing of traffic, identification of the path experiencing the problem, and/or identification of traffic forwarding inaccuracies and their sources. More specifically, ping and traceroute packets are not handled by the dataplane, as they are processed by the CPU of the router, which makes their experience different from user packets and do not reflect the reality of any dataplane issues.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

Figure 1A:
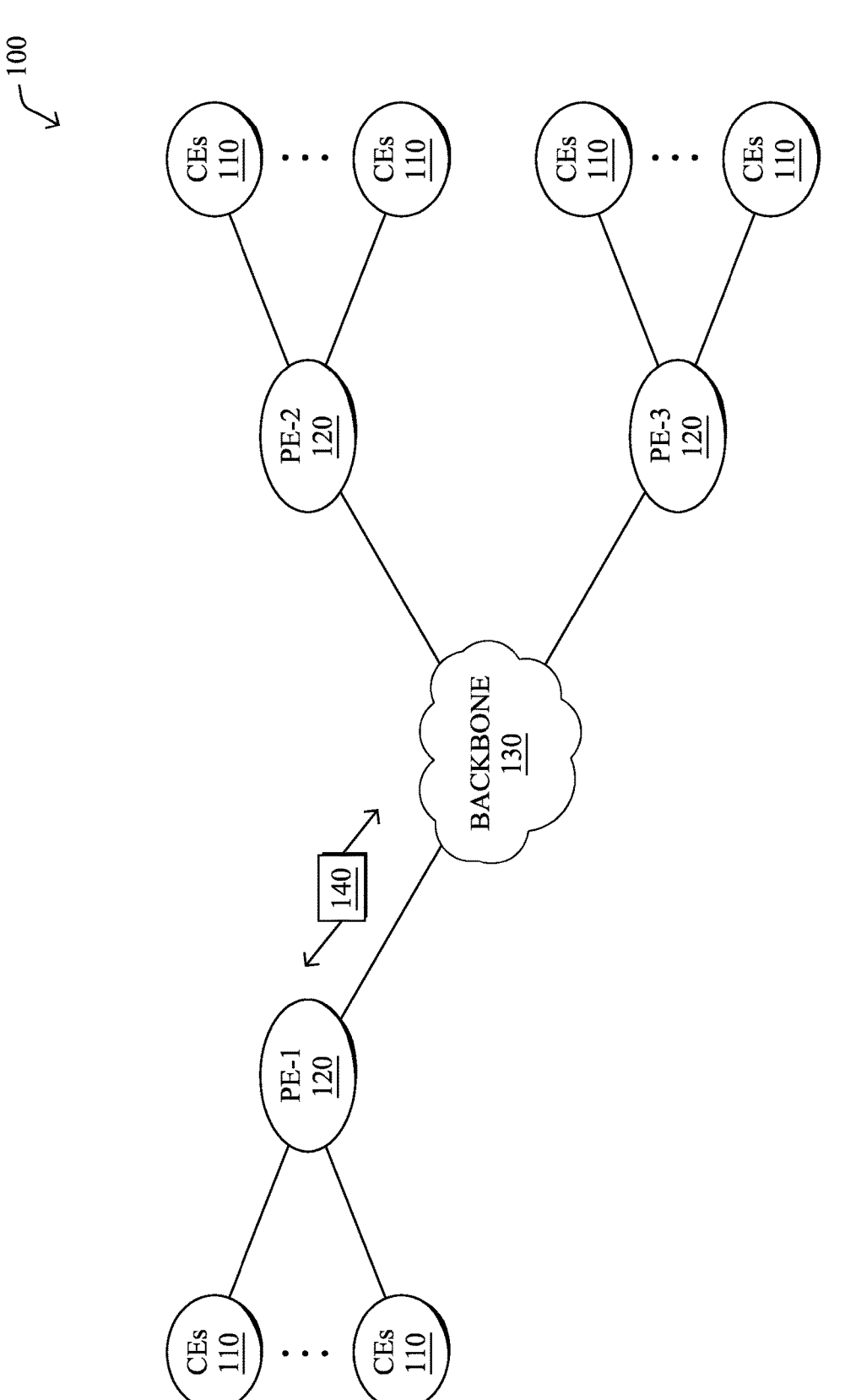
FIGS. 1A-1B illustrate an example communication network.

According to one or more implementations of the disclosure, a device may combine and analyze different sources of information to detect blackholing and wrong/non-expected paths, thereby facilitating automated identification of the precise details of routing anomalies and dynamically informing network remediation and/or adaptation to the anomalies. For example, a device may identify, based on path tracing probes sent through a network, data plane forwarding paths between nodes in the network. The device may determine, based on topology data for the network, expected protocol-based paths between the nodes. The device may detect, based on a comparison of the data plane forwarding paths and the expected protocol-based paths between the nodes, a routing anomaly in the network when the data plane forwarding paths and the expected protocol-based paths differ. Then, the device may cause performance of a mitigation action in the network with respect to the routing anomaly.

Other implementations are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network (e.g., network 100) illustratively comprising nodes/devices, such as a plurality of routers/devices interconnected by links or networks, as shown. For example, customer edge (CE) routers (e.g., CE routers 110) may be interconnected with provider edge (PE) routers 120 (e.g., PE-1, PE-2, and PE-3) in order to communicate across a core network, such as an illustrative network backbone (e.g., network backbone 130). For example, routers (e.g., CE routers 110), routers 120 may be interconnected by the public Internet, a multiprotocol label switching (MPLS) virtual private network (VPN), or the like. Data packets 140 (e.g., traffic/messages) may be exchanged among the nodes/devices of the network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router (e.g., CE routers 110) shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router (e.g., CE routers 110) connected to PE-2 and a second CE router (e.g., CE routers 110) connected to PE-3.

Figure 1B:
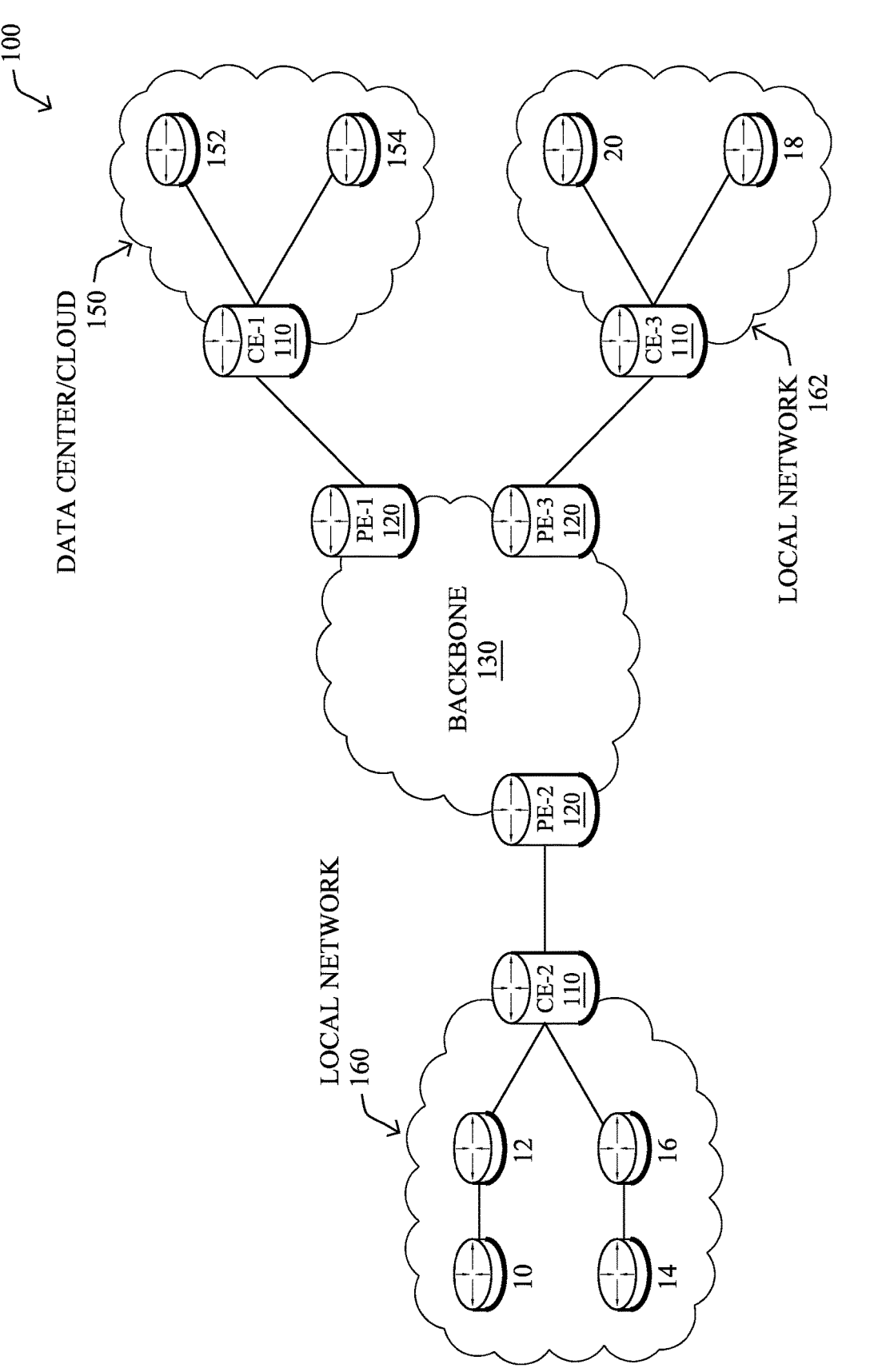

FIG. 1B illustrates an example of network 100 in greater detail, according to various implementations. As shown, network backbone 130 may provide connectivity between devices located in different geographical areas and/or different types of local networks. For example, network 100 may comprise local/branch networks (e.g., network 160-162) that include devices/nodes 10-16 and devices/nodes 18-20, respectively, as well as a data center/cloud environment 150 that includes servers 152-154. Notably, local networks (e.g., network 160-162) and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in network backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
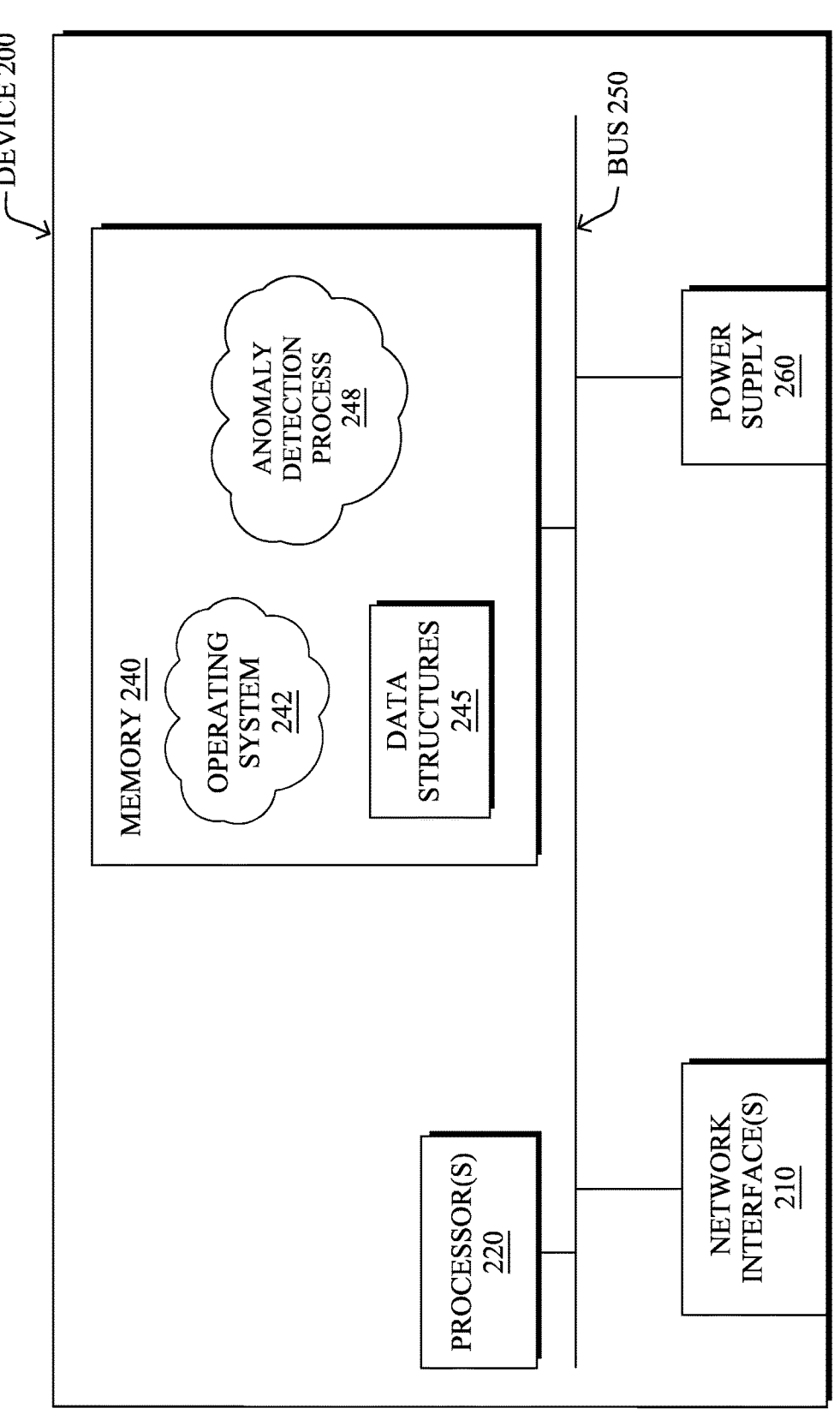
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE routers (e.g., routers 120), CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces (e.g., network interfaces 210), one or more processors (e.g., processor(s) 220), and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor (e.g., processor(s) 220) may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a anomaly detection process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

In some instances, anomaly detection process 248 may include computer executable instructions executed by the processor (e.g., processor(s) 220) to establishing network path visibility using an intelligent network path probing technique and/or to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, anomaly detection process 248 may consist solely of providing mechanisms necessary for source routing techniques. That is, for source routing, other devices in the network can tell the less capable devices exactly where to send the packets, and the less capable devices simply forward the packets as directed.

In various implementations, as detailed further below, anomaly detection process 248 may include computer executable instructions that, when executed by processor(s) 220, cause device 200 to perform the techniques described herein. To do so, in some implementations, anomaly detection process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, anomaly detection process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that the anomaly detection process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites is sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact on the overall Internet due to the extreme virtualization of services and shift of traffic load in many large enterprises. Consequently, a branch office or a campus can trigger massive loads on the network.

Figure 3A:
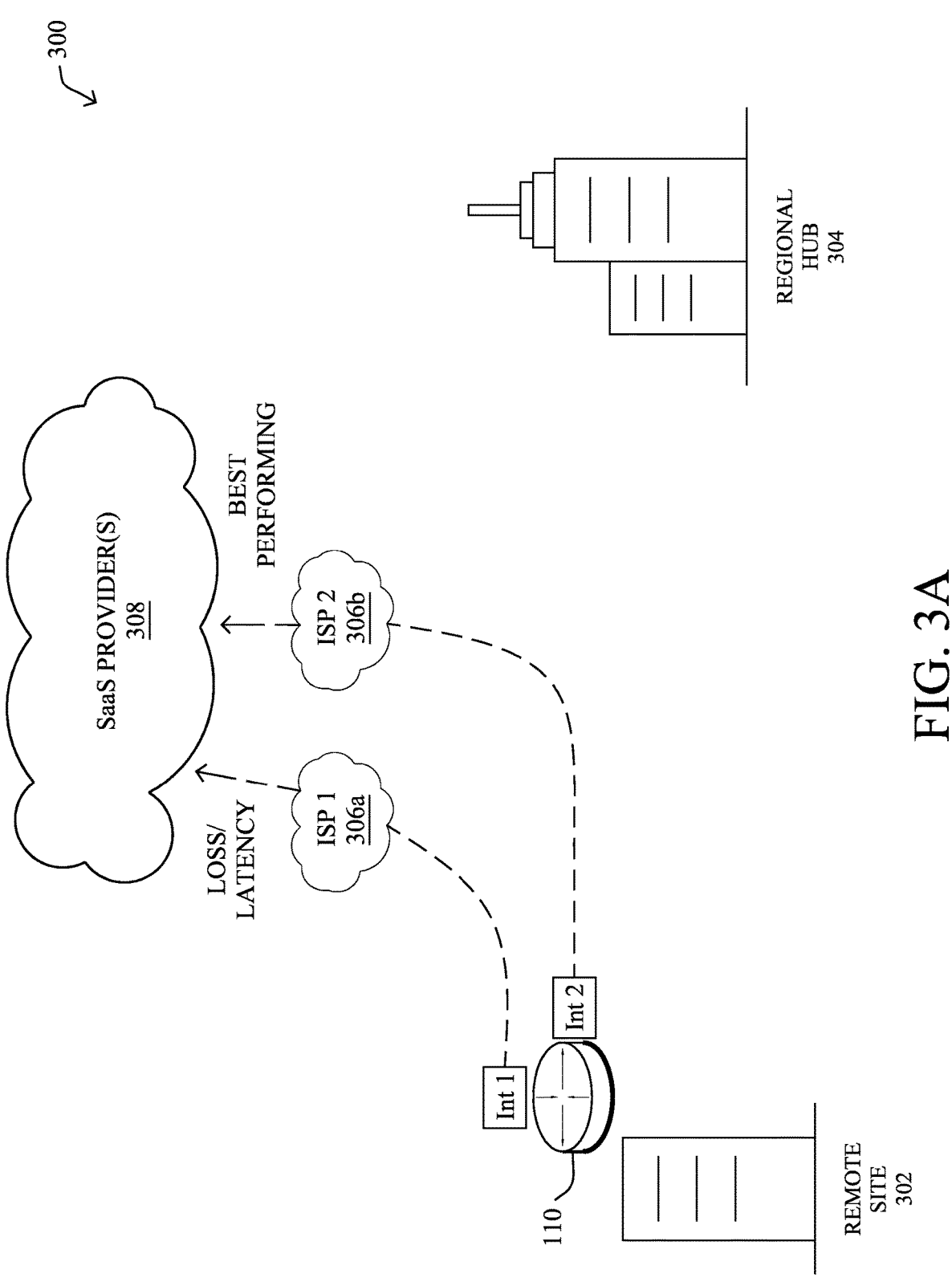
FIGS. 3A-3B illustrate example network deployments.
Figure 3B:

FIGS. 3A-3B illustrate examples of network deployments 300, 310, respectively. As shown, a router (e.g., CE routers 110) located at the edge of a remote site 302 may provide connectivity between a local area network (LAN) of the remote site 302 and one or more cloud-based, SaaS providers (e.g., provider(s) 308). For example, in the case of an SD-WAN, router (e.g., CE routers 110) may provide connectivity to SaaS provider(s) (e.g., provider(s) 308) via tunnels across any number of networks 306. This allows clients located in the LAN of remote site 302 to access cloud applications (e.g., Office 365™, Dropbox™, etc.) served by SaaS provider(s) (e.g., provider(s) 308).

As would be appreciated, SD-WANs allow for the use of a variety of different pathways between an edge device and a SaaS provider. For example, as shown in example network deployment 300 in FIG. 3A, router (e.g., CE routers 110) may utilize two Direct Internet Access (DIA) connections to connect with SaaS provider(s) 308. More specifically, a first interface of router (e.g., CE routers 110) (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router (e.g., CE routers 110), Int 2, may establish a backhaul path with SaaS provider(s) 308 via a second ISP 306b, denoted ISP 2 in FIG. 3A.

FIG. 3B illustrates another example network deployment 310 in which Int 1 of (e.g., CE routers 110) at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router (e.g., CE routers 110) may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

As noted above, service providers, and enterprises that operate or depend on IP/Internet based networks for critical business need to understand both the paths that their network traffic takes and the performance of those paths. Ideally, network path performance data should identify as many specific IP hops (routers) as possible in the path, and the performance impact of each of those hops/segments on the overall end-to-end performance of a given network connection.

Generally, synthetic network probing techniques are utilized to identify network paths. These techniques generate network traffic from a source to a destination using the same traffic characteristics as the application/services whose performance is sought to be understood. In addition, traceroute-style algorithms may be used to achieve these insights by leveraging the IP packet time to live (TTL) header and TTL Expired Internet Control Message Protocol (ICMP) responses from routers to build hop-by-hop representations of the paths taken by those same synthetic probe packets. In this way, the measured performance of these synthetic packets and the network paths is often assumed to be an accurate approximation of the actual performance and path of the corresponding applications/services.

—Observability Intelligence Platform—

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicates the troubleshooting efforts.

Certain aspects of one or more implementations herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 4 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a web-site is loading, how an application is performing, how a particular business transaction (or a particular type of business transaction) is being effected, and so on, whether for individual devices, a category of devices (e.g., type, location, capabilities, etc.), or any other suitable implementations of categorical classification.

Figure 4:
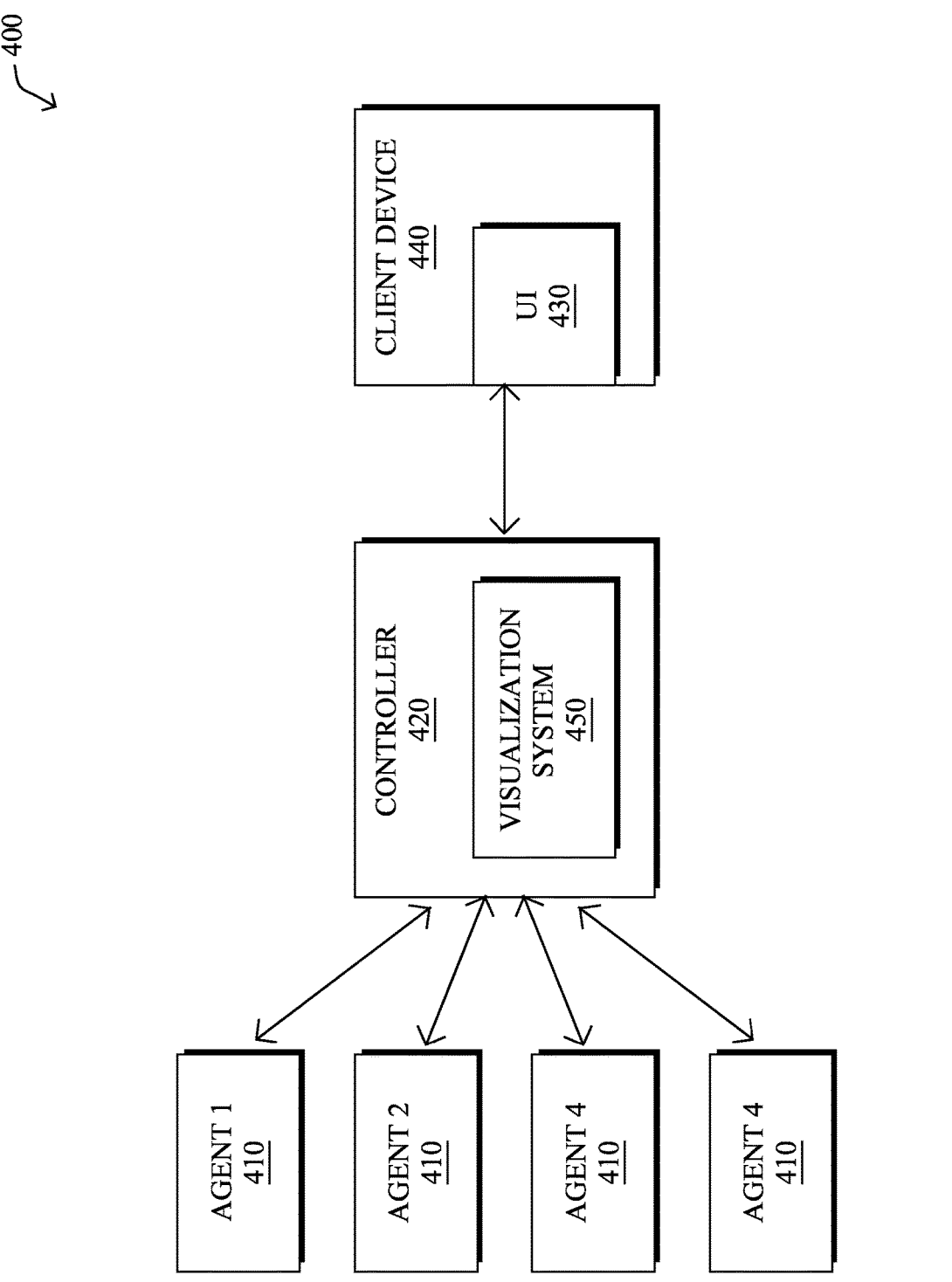
FIG. 4 illustrates a block diagram of an example of an observability intelligence platform.
Figure 5A:
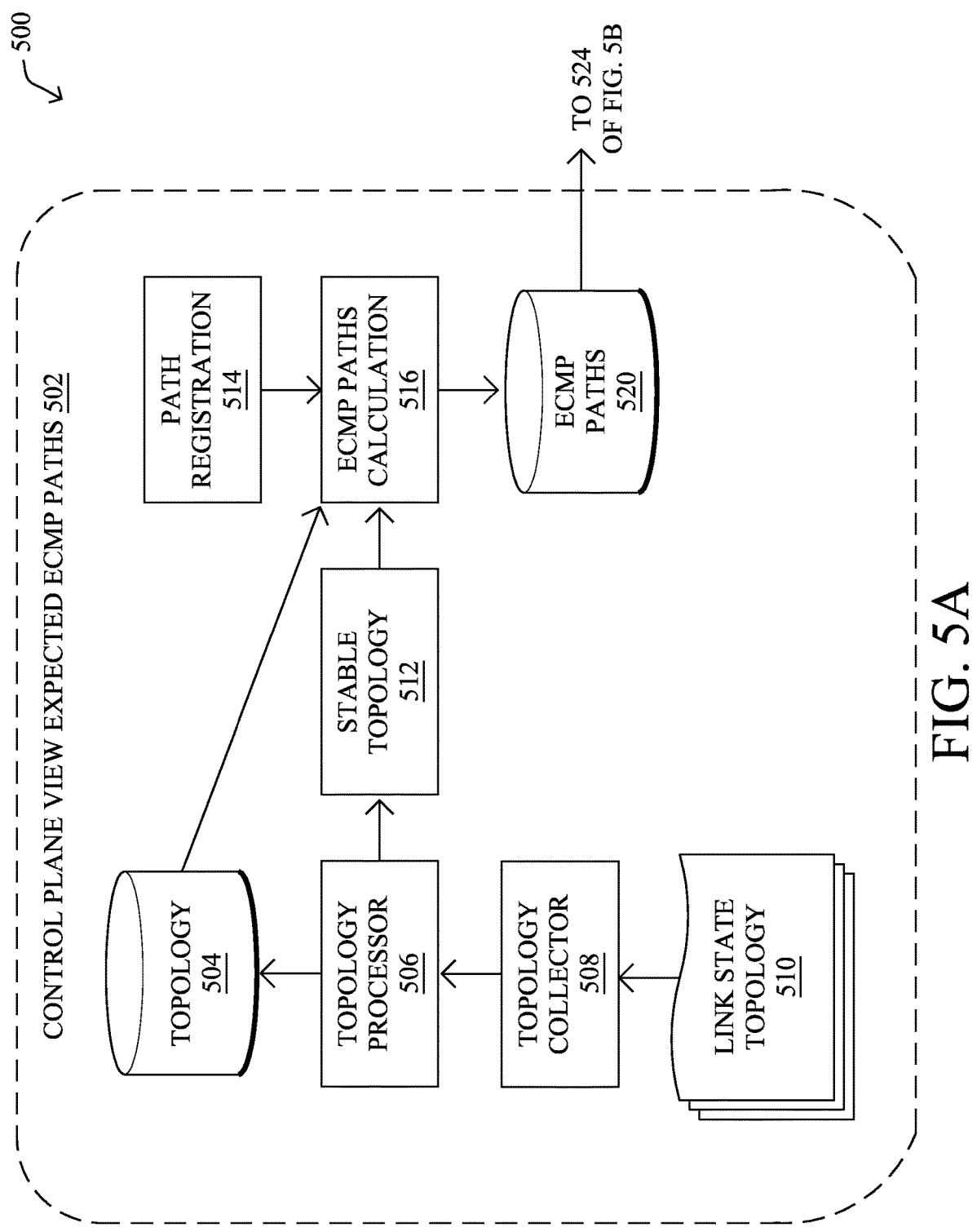
FIGS. 5A-5D illustrate an example of an architecture for a network observability solution for detecting routing anomalies.
Figure 5B:
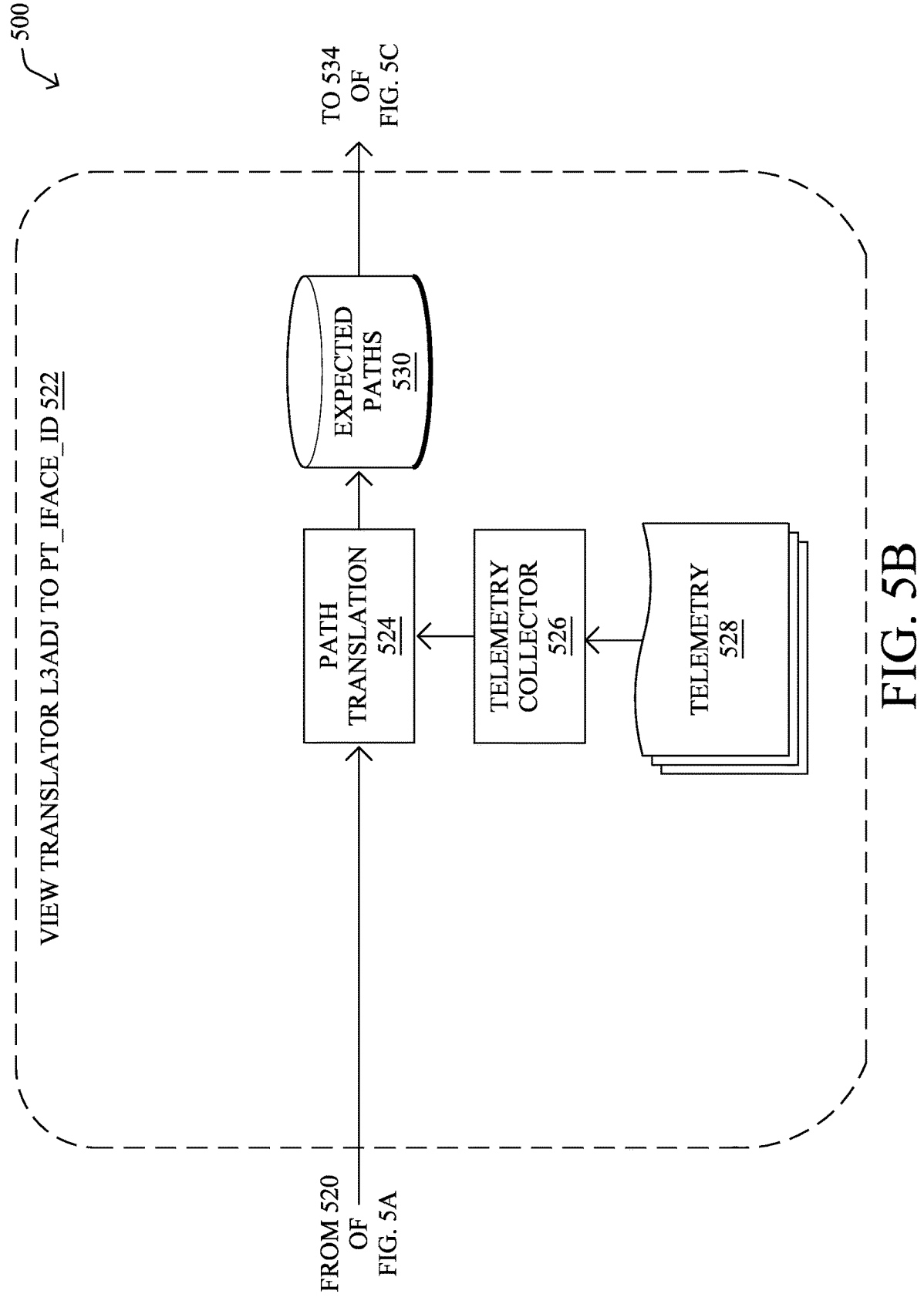
Figure 5C:
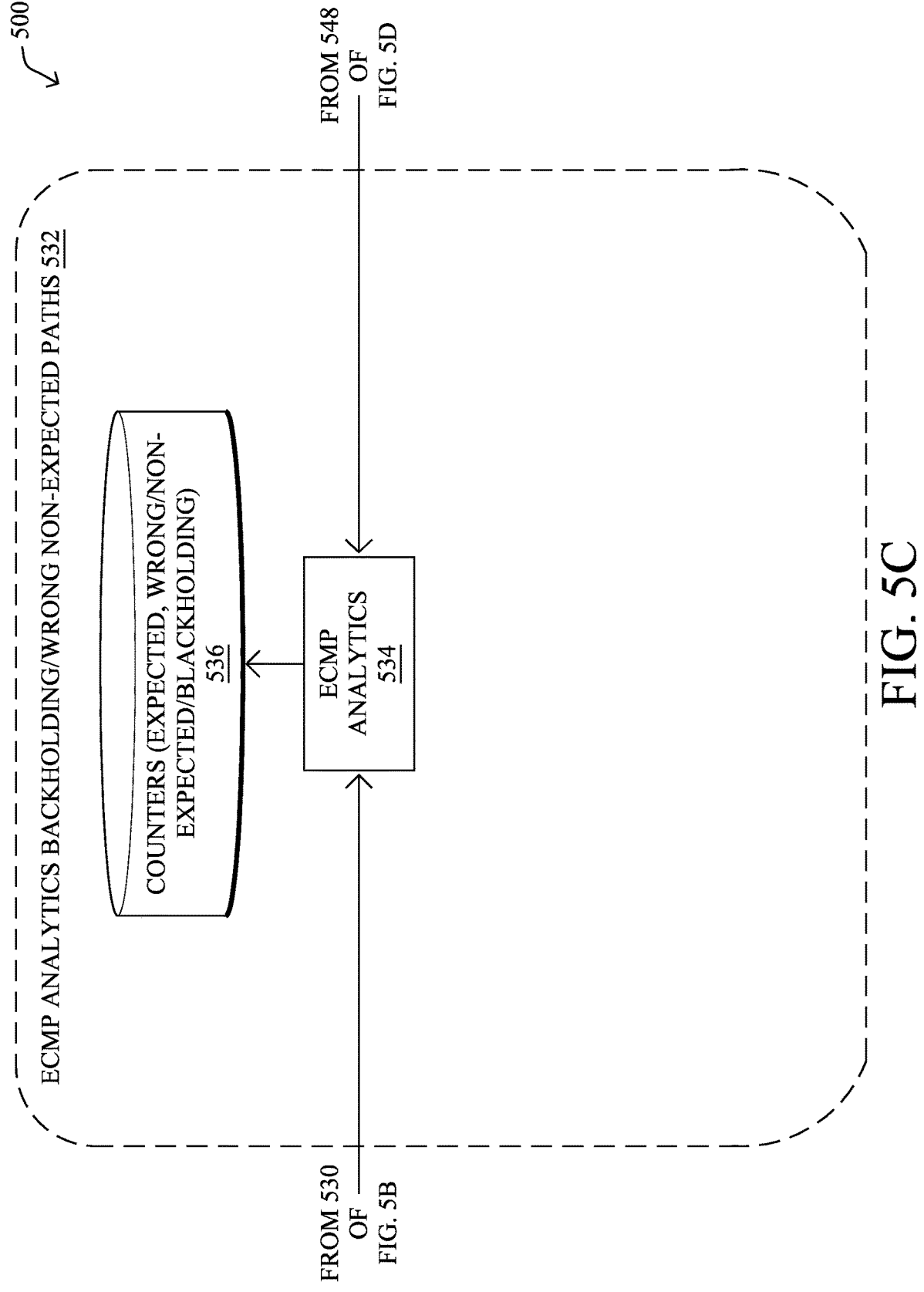
Figure 5D:
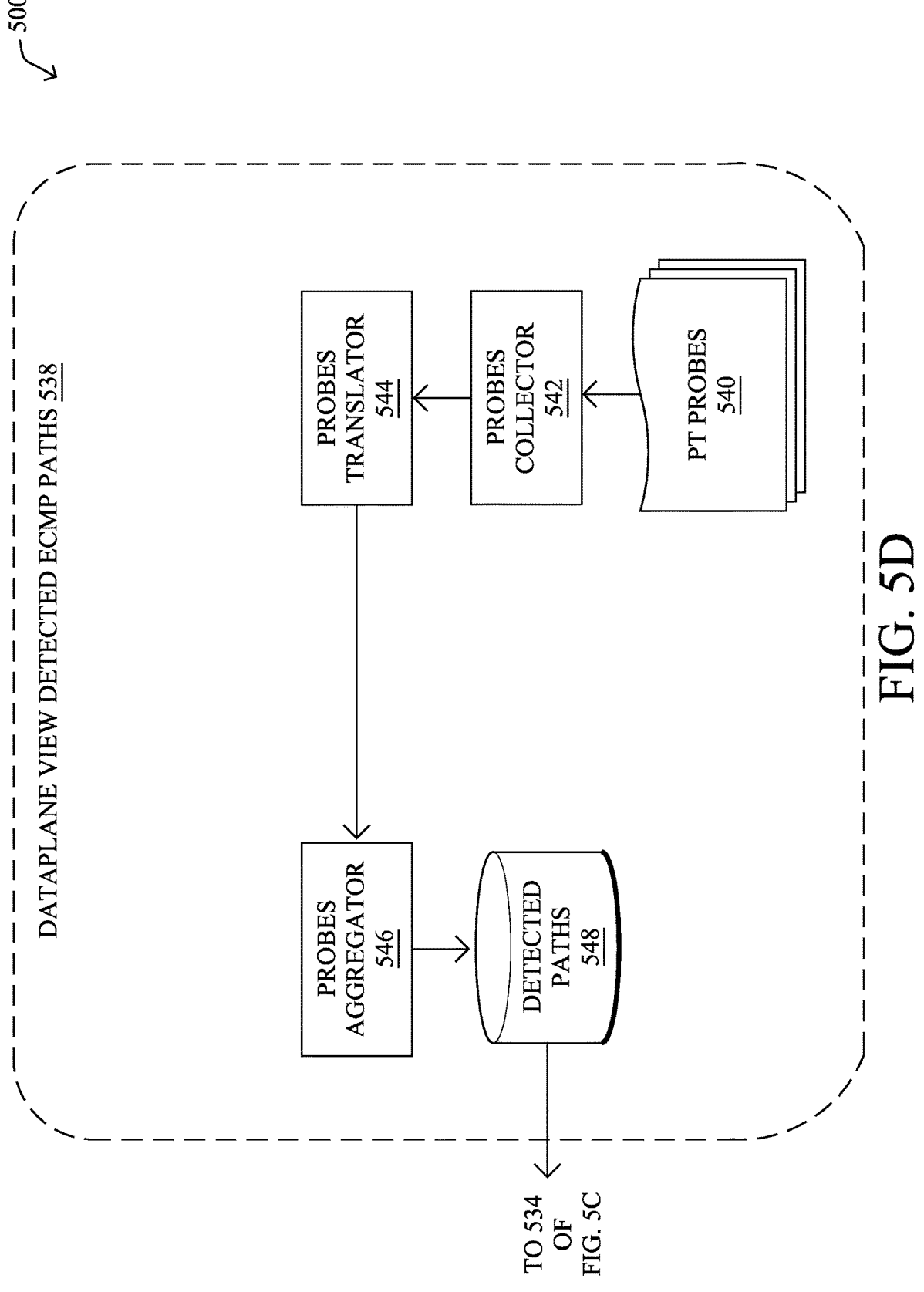

FIG. 4 is a block diagram of an example of an observability intelligence platform 400 that can implement one or more aspects of the techniques herein. The observability intelligence platform is a system that monitors and collects metrics of performance data for a network and/or application environment being monitored. At the simplest structure, the observability intelligence platform includes one or more agents (e.g., agents 410) and one or more servers/controllers 420. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) (e.g., controller 420) as directed. Note that while FIG. 4 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 420 is the central processing and administration server for the observability intelligence platform. Controller 420 may serve a browser-based user interface (UI) (e.g., interface 430) that is the primary interface for monitoring, analyzing, and troubleshooting the monitored environment. Specifically, the controller 420 can receive data from agents 410 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 430. The interface 430 may be viewed as a web-based interface viewable by a client device 440. In some implementations, a client device 440 can directly communicate with controller 420 to view an interface for monitoring data. The controller 420 can include a visualization system 450 for displaying the reports and dashboards related to the disclosed technology. In some implementations, the visualization system 450 can be implemented in a separate machine (e.g., a server) different from the one hosting the controller 420.

Notably, in an illustrative Software as a Service (SaaS) implementation, a controller instance (e.g., controller 420) may be hosted remotely by a provider of the observability intelligence platform 400. In an illustrative on-premises (On-Prem) implementation, a controller instance (e.g., controller 420) may be installed locally and self-administered.

Controller 420 receives data from different agents (e.g., Agents 1-4) (e.g., agents 410) deployed to monitor networks, applications, databases and database servers, servers, and end user clients for the monitored environment. Any of the agents 410 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be implemented as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain implementations, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one implementation, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain implementations, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be implemented across multiple devices, on different devices, utilizing additional devices, and so on, and the views shown herein are merely simplified examples that are not meant to be limiting to the scope of the present disclosure.

—Network Observability Solution for Detecting Routing Anomalies—

As noted above, the problems of blackholing paths and inaccurate forwarding are some of the most challenging and common problems that almost every network operator faces. Operators are heavily using ECMP (Equal Cost Multi-Path) in their network. Further, the number of available ECMP paths between two nodes is continuously increasing. Furthermore, the traffic load is growing faster than the availability of ever higher speed interfaces. More ports and line cards are being added to increase the bandwidth capacity and hence more ECMP Paths. Some operators are providing up to multiple thousands of ECMP paths between some provide edge (PE) routers to meet the traffic growth and network availability requirements.

ECMP paths are strongly impacted by dataplane/hardware (HW) issues including forwarding information base (FIB)/ Hardware corruption, which can lead to unexpected behaviors spanning from traffic drops (e.g., blackhole) to forwarding over a wrong path (i.e., path different from the one expected by the control plane).

The impact of blackholing paths on the network can be severe and frequently results in non-negligible service degradation. Often Web/and over-the-top (OTT) entities attest that blackholing of traffic is due to FIB programming errors on one of the linecards. Consequently, there is an escalating demand for a solution to detection and reporting of blackholing including identifying the path experiencing the problem.

Unfortunately, there are no existing reliable mechanisms for detection of the black holing of traffic, identification of the path experiencing the problem, and/or identification of traffic forwarding inaccuracies and their sources.

In contrast, the techniques herein provide a mechanism that allows operators and/or network traffic management systems to address the above outlined deficiencies. For instance, the techniques provide a mechanism for blackholing detection and resolution. This may include determining and generating lists of black holing paths and/or for each blackholing path. In addition, this may include identifying a node at which the path is being blackholed.

Moreover, these techniques may provide a mechanism for inaccurate path forwarding detection and resolution. This may include determining and generating lists of wrong/nonexpected path utilization. For each inaccurate forwarding path, the node at which the path is being drifted from the accurate or correct ECMP path may be identified by this mechanism.

This new functionality may be integrated with network observability platforms (e.g., observability intelligence platform 400). There, it may be leveraged to provide insights into operators' ECMP status and/or network anomaly source remediation/avoidance.

Specifically, according to various implementations, a method is disclosed comprising: identifying, based on path tracing probes sent through a network, data plane forwarding paths between nodes in the network; determining, based on topology data for the network, expected protocol-based paths between the nodes; detecting, based on a comparison of the data plane forwarding paths and the expected protocol-based paths between the nodes, a routing anomaly in the network when the data plane forwarding paths and the expected protocol-based paths differ; and causing performance of a mitigation action in the network with respect to the routing anomaly.

FIGS. 5A-5D illustrate an example of an architecture 500 for a network observability solution for detecting routing anomalies, according to various implementations. Architecture 500 may, in some examples, illustrate the components and/or operations involved in the execution of anomaly detection process 248 and/or observability intelligence platform 400.

In architecture 500, different sources of information may be analyzed and/or combined in order to detect blackholing and/or inaccurate (e.g., wrong/non-expected) paths. For example, path tracing probes 540, telemetry information, and/or topology information 510 may be used to detect blackholing and/or inaccurate (e.g., wrong/non-expected) paths.

Path tracing probes 540 may be employed as illustrated in dataplane view detected ECMP Paths portion 538 of architecture 500. The path tracing probes 540 may be utilized to detect and generate a list of dataplane forwarding network paths (e.g., detected paths 548). The path tracing probes 540 or responses thereto may be collected by probes collector 542. Then, probes translator 544 and probes aggregator 546 may determine and/or compile a list of detected paths (e.g., detected paths 548) being utilized within the network.

In any given network, to understand the routing behavior between two devices or nodes (identified as A and Z), the system can create and/or dispatch specialized diagnostic packets, referred to as path tracing probes 540. The system may offer an interface (API) that network operators can use to select any two nodes in the network for which they wish to analyze the routing paths. The path tracing probes 540 may be generated with unique identifiers known as flow labels, which ensure that the path tracing probes 540 are distributed across different potential paths in the network, covering all possible routes that data could travel between nodes A and Z.

As these path tracing probes 540 move through the network, each router or node they pass through may log specific information-namely, the path tracing ID of the exit interface that the packet is forwarded through. This path tracing ID uniquely identifies each segment of the path.

Once the path tracing probes 540 have completed their journey across the network's Equal-Cost Multi-Path (ECMP) routes, which are paths that theoretically have the same cost and can be used interchangeably to reach the same destination, the system compiles a list of distinct paths that were detected (e.g., detected paths 548). It may achieve this by collating the unique path tracing IDs recorded by the path tracing probes 540. Each path may be represented as a sequence of interface IDs, which, when combined, provide a complete route from node A to node Z.

By way of a hypothetical illustration, three different paths might be detected, each delineated by a unique combination of interface IDs. For instance, these three paths may be identified as a Detected_Path_List including: Detected_Path1=PT-IFACE-ID-11_PT-IFACE-ID-21_PT-IFACE-ID-31; Detected_Path2=PT-IFACE-ID-51_PT-IF-ACE-ID-61_PT-IFACE-ID-71; and Detected_Path3=PT-IF-ACE-ID-11_PT-IFACE-ID-41_PT-IFACE-ID-61_PT-IFACE-ID-71 in detected paths 548. This may allow for visual and/or programmatic examination of the specific routes that network traffic is taking (e.g., detected paths 548).

Topology information 510 may be utilized as illustrated in control plane view expected ECMP Paths portion 502 of architecture 500. Here, topology information 510 of the network may be collected by topology collector 508. The topology information 510 can be collected through telemetry (e.g., BGP Monitoring Protocol "BMP", BGP Link state "BGP-LS" or any topology service).

By processing the topology information 510 through topology processor 506 and generating topology 504, stable topology 512 and/or path registration 514 inputs, architecture 500 may provide inputs to ECMP paths calculation 516 to compute the list of expected paths (e.g., expected paths 520) between nodes A and Z. That is, ECMP paths calculation 516 may include a path calculation service that computes, based on the gathered topology information (e.g., topology information 510), a list of all the plausible and/or expected routes that traffic could potentially take between two specific points in the network, identified as A and Z.

This list of expected paths (e.g., expected paths 520) may be represented as a list of layer 3 (L3) adjacencies. For instance, in one example one anticipated route might be depicted as a sequence of such connections as Expected Path1=L3Adj11_L3Adj21 L3Adj21, and another might be depicted as Expected Path 2=L3Adj51_L3Adj61_L3Adj71. Each sequence represents a complete path from point A to point Z as predicted by the network's current configuration.

In addition, telemetry information 528 may be utilized as illustrated in view translator L3Adj to PT_IFACE_ID portion 522 of architecture 500. Telemetry information 528 may be collected by a telemetry collector 526 and utilized for path translation 524. For instance, architecture 500 may include a service for path translation 524 that translates the expected ECMP Path which may be represented as list of L3Adj to a list of path tracing interface IDs.

This translation service may utilize streaming telemetry to collect the interface configuration which includes the path tracing interface ID assigned to the interface. This streaming may be used to build a mapping table between L3Adj and path tracing interface ID (e.g., translated expected paths 530).

In continuance of the first example provided above, Expected Path 1 and Expected path 2 may be translated (L3Adj to PT_IFACE_ID) accordingly: Expected_Path1=L3Adj11_L3Adj21_L3Adj21=>PT-IF-ACE-ID-11_PT-IFACE-ID-21_PT-IFACE-ID-31 and Expected_Path2=L3Adj51_L3Adj61_L3Adj71=>PT-IF-ACE-ID-51_PT-IFACE-ID-61_PT-IFACE-ID-71.

In various implementations The L3Adj can be associated with an interface bundle. Each member of the bundle may have a different path tracing ID. Hence, the translation of L3Adj into PT Interface ID (PT_IFACE_ID) may yield several ECMP Paths based on the number of interfaces in the bundle. This facilitates visibility into each member of the bundle and detect blackholing caused by a failure of a bundle member.

For example, assume that L3Adj51 is associated with an interface bundle that has two members. Then the list of ECMP paths of the first example would be three instead of two. The two members of L3Adj51 may have PT interface IDs of PT-IFACE-ID-51 and PT-IFACE-ID-52. Therefore, the expected path list may include Expected_Path1=L3Adj11_L3Adj21_L3Adj21=>PT-IF-ACE-ID-11_PT-IFACE-ID-21_PT-IFACE-ID-31, Expected_Path2=L3Adj51_L3Adj61_L3Adj71=>PT-IF-ACE-ID-51_PT-IFACE-ID-61_PT-IFACE-ID-71, and/or Expected_Path3=L3Adj51_L3Adj61_L3Adj71=>PT-IF-ACE-ID-52_PT-IFACE-ID-61_PT-IFACE-ID-71.

Architecture 500 may include ECMP analytics component 534. ECMP analytics component 534 may analyze the detected paths 548 detected by path tracing versus the expected paths 520 computed by the ECMP paths calculation 516 component based on the control plane (topology) information. More specifically, ECMP analytics component 534 can compare the detected paths 548 with the expected paths 520 between A and Z by virtue of the translation of expected paths 520 to translated expected paths 530 facilitating direct comparison with the detected paths 548 (e.g., an interface ID to interface ID comparison).

ECMP analytics component 534 may detect blackholing and inaccurate (e.g., wrong/non-expected) based on this comparison. For example, ECMP analytics component 534 may detect blackholing path where a particular expected path computed by the control plane based on the control plane information was not detected by the path tracing probes 540. ECMP analytics component 534 may detect inaccurate paths based on particular paths being identified by the dataplane view (e.g., path tracing probes 540) that do not map to any path in the control plane view (e.g., path calculation based on topology information 510).

To illustrate this analysis in terms of the examples outlined above, ECMP analytics component 534 may compare the detected paths list of Detected_Path1=PT-IFACE-ID-11_PT-IFACE-ID-21_PT-IFACE-ID-31, Detected_Path2=PT-IFACE-ID-51_PT-IFACE-ID-61_PT-IFACE-ID-71, and Detected_Path3=PT-IFACE-ID-11_PT-IFACE-ID-41_PT-IFACE-ID-61_PT-IFACE-ID-71 to an expected paths list of Expected_Path1=L3Adj11_L3Adj21_L3Adj21=>PT-IF-ACE-ID-11_PT-IFACE-ID-21_PT-IFACE-ID-31, Expected_Path2=L3Adj51_L3Adj61_L3Adj71=>PT-IF-ACE-ID-51_PT-IFACE-ID-61_PT-IFACE-ID-71, and Expected_Path3=L3Adj51_L3Adj61_L3Adj71=>PT-IF-ACE-ID-52_PT-IFACE-ID-61_PT-IFACE-ID-71. By analyzing these lists, ECMP analytics component 534 may determine matching, correct, and/or expected path behavior (e.g., E). For instance, ECMP analytics component 534 may determine that the expected paths (E)=2 where the detected path=expected path: Expected_Path1=Detected_Path1=PT-IFACE-ID-11_PT-IFACE-ID-21_PT-IFACE-ID-31 and Expected_Path2=Detected_Path2=PT-IFACE-ID-51_PT-IFACE-ID-61 PT-IFACE-ID-71.

Additionally, ECMP analytics component 534 may detect inaccurate (e.g., wrong/non-expected) path use (e.g., N) based on analysis of these lists. For instance, ECMP analytics component 534 may determine that inaccurate path use (N)=1 where the detected path is not in the expected path list: Detected_Path3=PT-IFACE-ID-11_PT-IFACE-ID-41_PT-IFACE-ID-61_PT-IFACE-ID-71. By comparing the inaccurate path use (e.g., Detected_Path3) to the correct list of expected paths (e.g., E), specifically Expected_Path1, ECMP analytics component 534 may identify that Node1 is where the traffic gets drifted from the correct ECMP Path. The comparison reveals that Node1 forwards probes to Node4 (PT-IFACE-ID-41) instead forwarding it directly to Node6 (PT-IFACE-ID-61) as is expected.

Furthermore, ECMP analytics component 534 may detect blackholing paths (e.g., B) based on analysis of these lists. For instance, ECMP analytics component 534 may determine that blackholing paths (B)=1; where the expected path is not in the detected path list: Expected_Path3=PT-IFACE-ID-52_PT-IFACE-ID-61_PT-IFACE-ID-71. By comparing blackholing path (Expected_Path3) to the correct list of expected paths (E), specifically Expected_Path2, ECMP analytics component 534 may identify that Node1 is where the traffic gets blackholed. For example, Node1 doesn't forward any probes on the second interface (PT-IFACE-ID-52) of the bundle associated with L3Adj51.

ECMP analytics component 534 may generate various outputs based on these determinations. The outputs may be utilized for detection and precise identification of expected path use, wrong/non-expected path use, and/or blackholing. For example, the outputs of ECMP analytics component 534 may include a list of blackholing paths. For each blackholing path, the outputs may include an identification of the node at which the path is being blackholing. Further, the outputs of ECMP analytics component 534 may include a list of wrong/non-expected paths. For each wrong forwarding path detected, the outputs may include an identification of the node at which the path is being drifted from the correct ECMP Path.

Furthermore, the outputs may include reports on the status of the network over time as counters 536 for each time period (e.g., every minute). For example, counters 536 for expected (E), wrong/non-expected (N) and/or blackholing (B) paths may be maintained and/or incremented by ECMP analytics component 534.

Moreover, outputs from ECMP analytics component 534 may be integrated into and/or leveraged by network observability platforms to provide insights in an operators' ECMP fabric status and inform routing decisions and anomaly remediation procedures. ECMP analytics component 534 outputs may be utilized to monitor best-effort ECMP Paths as well as Segment Routing (SR) Policy Traffic Engineering (TE) Policy (e.g., Segment Identifier (SID) List) Paths for any traffic class (e.g., DSCP). Further, these outputs may provide visibility into each member of bundle interfaces and detect blackholing caused by a failure of a bundle member.

To summarize, architecture 500 may operate utilizing a variety of inputs. For example, topology information 510 (e.g., Link State Database "LSDB"), L3Adj to path tracing interface ID mapping table (e.g., L3Adj-PT_IFACE_ID-MAP) (e.g., path translation 524), telemetry information 528 (e.g., interface config including path tracing interface ID), a list of registered node-pairs between which ECMP path analytics are to be collected, and/or a path tracing probes database may be utilized as inputs. Operating with these inputs, ECMP analytics component 534 may, for each pair (A, Z) in the list of registered node-pairs, compute the list of expected ECMP paths (e.g., Expected_Path_List) between (A, Z) using the ECMP path Calculation service.

A path calculation service may compute ECMP paths based on the input topology collected via telemetry/BGP-LS or any other topology service. For each ECMP in the Expected_Path_List, a L3Adj-PT_IFACE_ID-MAP may be utilized to convert the ECMP path from list of L3Adj to List of Path Tracing Interface ID (e.g., L3Adj11_L3Adj21 L3Adj21=>PT-IFACE-ID-11_PT-IFACE-ID-21_PT-IF-ACE-ID-31).

The list of Probes between A and Z may be retrieved from a path tracing probes database. Further, a list of unique ECMP paths (e.g., Detected_Path_List) may be computed between A and Z. Each Detected Path may be represented within a list of path tracing interface ID (e.g., PT-IFACE-ID-11_PT-IFACE-ID-21_PT-IFACE-ID-31).

For each path (e.g., PATH) in the Expected_Path_List for which a matching path exists in the Detected_Path_List, a counter (e.g., in counters 536) of expected paths (E) may be incremented. Then, the path to may be added to the list ECMP_Analytics_Expected_Paths and the score of the path in the Detected_Path_List may be incremented. Alternatively, if that path does not exist in the Detected_Path_List, the counter (e.g., in counters 536) of blackholing paths (B) may be incremented. Then, the path may be added to the list ECMP_Analytics_Blackholing_Paths.

For each path (e.g., PATH) in the Detected_Path_List, if the path score=0, then the counter of wrong/non-expected paths (N) may be incremented, and the path may be added to the list ECMP_Analytics_NON-Expected_Paths. Then, the following may be written to the timeseries DB: the counter of expected paths (E); the ECMP_Analytics_Exected_Paths list; the counter of blackholing paths (B); the ECMP_Analytics_Blackholing_Paths list; the counter of wrong/non-expected paths (N); and/or the ECMP_Analytics_NON-Expected_Paths list.

Figure 6:
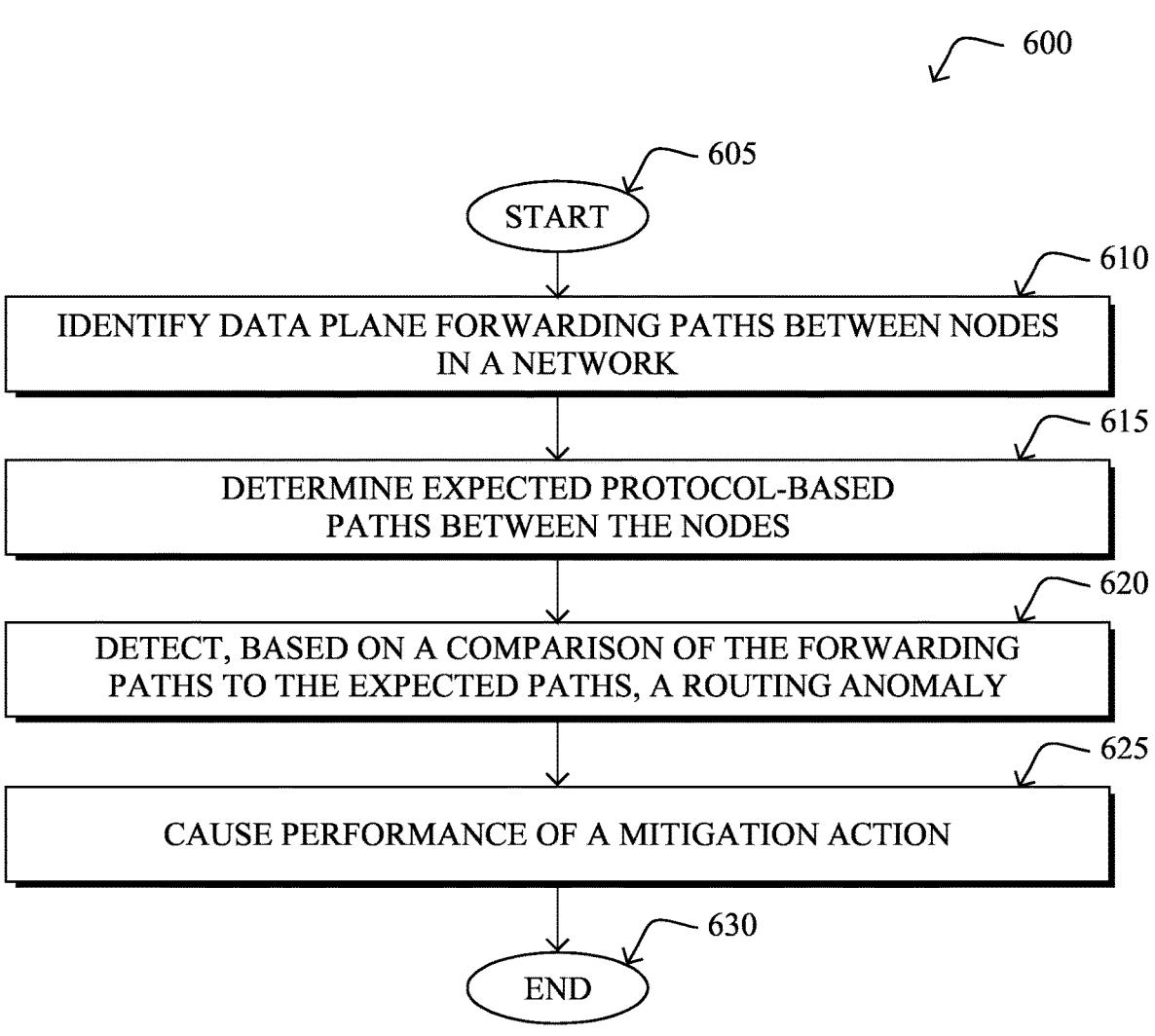
FIG. 6 illustrates an example of a simplified procedure for implementing a network observability solution for detecting routing anomalies in accordance with one or more implementations described herein.

In closing, FIG. 6 illustrates an example of a simplified procedure for implementing a network observability solution for detecting routing anomalies in accordance with one or more implementations described herein. For example, a non-generic, specifically configured device (e.g., device 200) may perform procedure 600 by executing stored instructions (e.g., anomaly detection process 248). The procedure 600 may start at step 605, and continues to step 610, where, as described in greater detail above, a device may identify, based on path tracing probes sent through a network, data plane forwarding paths between nodes in the network. This may include generating the path tracing probes with different flow labels such that each path tracing probe is routed through a different forwarding path in the network. In various implementations, each unique data plane forwarding path of the data plane forwarding paths may be identified based on a sequence of path tracing identifiers acquired from egress interfaces traversed by a corresponding path tracing probe.

At step 615, the device may determine, based on topology data for the network, expected protocol-based paths between the nodes. The paths (e.g., determined data plane forwarding paths and/or expected protocol-based paths) between the nodes may be equal cost multi-path paths between nodes in the network. The protocol-based paths may be based on an interior gateway protocol. That is, the expected paths may be interior gateway protocol paths.

At step 620, the device may cause a comparison of the data plane forwarding paths and the expected protocol-based paths. In various implementations, the expected protocol-based paths between the nodes may be translated from a list of Layer 3 adjacencies into a list of path tracing interface identifiers. This translation may facilitate the comparison by placing both the expected and the determined paths in the same and/or comparable terms.

The device may detect, based on the comparison, a routing anomaly in the network when the data plane forwarding paths and the expected protocol-based paths differ. The routing anomaly may be a blackholing path and/or node. The blackholing path and/or node may be detected based on an expected protocol-based path not being detected as a data forwarding path by the path tracing probes.

Alternatively, the routing anomaly may be a wrong or non-expected path being utilized. The wrong or non-expected path may be detected based on a data forwarding path detected by the path tracing probes not mapping to an expected protocol-based path.

At 625, the device may cause performance of a mitigation action in the network with respect to the routing anomaly. the above-outlined comparison, node-level visibility into routing anomalies. For instance, the device may identify, based on the comparison, a node in the network at which a path is being drifted from a correct path. In various implementations, the mitigation action may include providing this visibility (e.g., graphically) to a network administrator or other user.

Additionally, or alternatively, the mitigation action may include generating an alert configured to inform a user and/or a network management system of the routing anomaly, of specific and/or node-level data associated with the routing anomaly, and/or of suggested remedial actions (e.g., modified routing configurations, modified devices settings, equipment repair/replacement suggestions, etc.) to mitigate the routing anomaly. For instance, the mitigation action may include generating an alert that indicates the presence of a misconfigured line card at a particular node that is associated with the routing anomaly.

In various implementations, the mitigation action may include execution of remedial actions directed to resolving the routing anomaly. For example, the device may cause a reconfiguration of a misconfigured node in the network, initiate the repair or replacement of a failed link, cause a reconfiguration of a line card at a particular node etc. to mitigate the routing anomaly responsive to identifying the routing anomaly, its source, and/or the applicable mitigatory actions (e.g., automatically). Additionally, the device may cause a reconfiguration of the routing protocols utilized in a network, adjust network settings, etc. to ensure that traffic is traveling along its intended path and/or avoiding anomalous paths.

Further, the device may cause adjustments to routing configurations to redistribute traffic across available paths in a manner that prevents overloading and/or optimizes network resource utilization in view of the anomalies. In addition, the device may facilitate rapid anomaly detection that allows for swift security protocols activation to mitigate potential threats. In essence, the device may provide a comprehensive toolkit for network management, enabling proactive management of network health, efficiency, and security, thereby facilitating more intelligent, responsive, and resilient infrastructures.

Procedure 600 then ends at step 630.

By introducing methodologies to combine and analyze different sources of information to detect the blackholing and wrong/non-expected paths, this procedure 600 facilitates automated identification of the precise details of routing anomalies and dynamically informs network remediation and/or adaptation to the anomalies. Accordingly, procedure 600 is able to provide real-time, granular insights into network path dynamics, significantly enhancing the detection and resolution of blackholing and incorrect forwarding paths.

Unlike existing systems that rely on periodic or passive monitoring techniques that are blind to any expected/detected path activity, procedure 600 proactively identifies discrepancies between expected and actual network paths, ensuring swift and precise issue resolution. Its integration with advanced telemetry and mapping technologies facilitates a deeper understanding of network behavior, leading to more effective load balancing, optimized traffic routing, and improved overall network performance. Moreover, its capacity to dynamically adapt to changing network conditions and its scalability make it a robust tool suited to the evolving demands of large-scale, complex network environments.

By transcending the limitations of current network monitoring tools, procedure 600 not only bolsters network reliability and efficiency but also enhances security and ensures compliance with stringent service-level agreements, thereby providing a comprehensive, future-proof solution for network observability and management.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

Illustratively, the techniques described herein may be performed by hardware, software, and/or firmware, such as in accordance with the illustrative anomaly detection process (e.g., anomaly detection process 248), which may include computer executable instructions executed by the processor(s) 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the anomaly detection process 248.

While there have been shown and described illustrative implementations that provide a network observability solution for detecting routing anomalies, it is to be understood that various other adaptations and modifications may be made within the spirit and scope of the implementations herein. For example, while certain implementations are described herein with respect to using certain types of routing strategies (e.g., ECMP) and/or protocols (e.g., IGP) of paths, the paths are not limited as such and may include other routing strategies and/or protocols that can be used for other functions, in other implementations.

Moreover, while the present disclosure contains many other specifics, these should not be construed as limitations on the scope of any implementation or of what may be claimed, but rather as descriptions of features that may be specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by an engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/ RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

What is claimed is:

1. A method, comprising:

identifying, by a device and based on path tracing probes sent through a network, all data plane forwarding paths being utilized for traffic between two particular nodes in the network, wherein the path tracing probes are generated to ensure distribution across all potential paths between the two particular nodes in the network;

determining, by the device and based on topology data for the network, all expected protocol-based paths to be utilized for traffic between the two particular nodes and translating each expected protocol-based path into a corresponding ordered sequence of path tracing interface identifiers, based on telemetry-derived associations between egress interfaces corresponding to hops of the expected protocol-based path and respective path tracing interface identifiers;

detecting, by the device, a routing anomaly in the network based on a comparison of the ordered sequence of path tracing interface identifiers for each expected protocol-based path against ordered path tracing interface-identifier sequences obtained from the path tracing probes; and causing, by the device, performance of a mitigation action in the network with respect to the routing anomaly.

2. The method as in claim 1, wherein the routing anomaly is a blackholing path.

3. The method as in claim 2, wherein the blackholing path is detected based on an expected protocol-based path not being detected as a data forwarding path by the path tracing probes.

4. The method as in claim 1, wherein the routing anomaly is a wrong or non-expected path.

5. The method as in claim 4, wherein the wrong or non-expected path is detected based on a data forwarding path detected by the path tracing probes not mapping to an expected protocol-based path.

6. The method as in claim 1, wherein the expected protocol-based paths are equal cost multi-path paths between two nodes in the network.

7. The method as in claim 1, wherein the expected protocol-based paths are based on an interior gateway protocol.

8. The method as in claim 1, wherein translating each expected protocol-based paths between the two particular nodes comprises translating a list of Layer 3 adjacencies into the corresponding ordered sequence a list of path tracing interface identifiers using the telemetry-derived associations.

9. The method as in claim 1, further comprising:

generating the path tracing probes with different flow labels such that each path tracing probe is routed through a different forwarding path in the network.

10. The method as in claim 1, wherein each unique data plane forwarding path of the data plane forwarding paths is identified based on a sequence of path tracing identifiers acquired from egress interfaces traversed by a corresponding path tracing probe.

11. The method as in claim 1, wherein detecting the routing anomaly includes identifying a node in the network at which a path is being drifted from a correct path.

12. The method as in claim 1, wherein the mitigation action includes generating an alert that indicates a misconfigured line card at a particular node.

13. The method as in claim 1, wherein the mitigation action includes reconfiguring a node in the network to mitigate the routing anomaly.

14. An apparatus, comprising:

one or more network interfaces to communicate with a network;

a processor coupled to the one or more network interfaces and configured to execute one or more processes; and a memory configured to store a process that is executable by the processor, the process, when executed, configured to:

identify, based on path tracing probes sent through a network, all data plane forwarding paths being utilized for traffic between two particular nodes in the network, wherein the path tracing probes are generated to ensure distribution across all potential paths between the two particular nodes in the network;

determine, based on topology data for the network, all expected protocol-based paths to be utilized for traffic between the two particular nodes and translate each expected protocol-based path into a corresponding ordered sequence of path tracing interface identifiers, based on telemetry-derived associations between egress interfaces corresponding to hops of the expected protocol-based path and respective path tracing interface identifiers;

detect a routing anomaly in the network based on a comparison of the ordered sequence of path tracing interface identifiers for each expected protocol-based path against ordered path tracing interface-identifier sequences obtained from the path tracing probes; and cause performance of a mitigation action in the network with respect to the routing anomaly.

15. The apparatus as in claim 14, wherein the routing anomaly is a blackholing path and wherein the blackholing path is detected based on an expected protocol-based path not being detected as a data forwarding path by the path tracing probes.

16. The apparatus as in claim 14, wherein the routing anomaly is a wrong or non-expected path, wherein the wrong or non-expected path is detected based on a data forwarding path detected by the path tracing probes not mapping to an expected protocol-based path, and wherein detecting the routing anomaly includes identifying a node in the network at which a path is being drifted from a correct path.

17. The apparatus as in claim 14, wherein the expected protocol-based paths are equal cost multi-path paths between two nodes in the network and wherein the expected protocol-based paths are based on an interior gateway protocol.

18. The apparatus as in claim 14, wherein the process is further configured to:

translate each expected protocol-based paths between the two particular nodes by translating a list of Layer 3 adjacencies into the corresponding ordered sequence of path tracing interface identifiers using the telemetry-derived associations.

19. The apparatus as in claim 14, wherein the mitigation action comprises at least one of: reconfiguring a node in the network to mitigate the routing anomaly or generating an alert that indicates a misconfigured line card at a particular node.

20. A tangible, non-transitory, computer-readable medium having computer-executable instructions stored thereon that, when executed by a processor on a computer, cause the computer to perform a method comprising:

identifying, based on path tracing probes sent through a network, all data plane forwarding paths being utilized for traffic between two particular nodes in the network, wherein the path tracing probes are generated to ensure distribution across all potential paths between the two particular nodes in the network;

determining, based on topology data for the network, all expected protocol-based paths to be utilized for traffic between the two particular nodes and translating each expected protocol-based path into a corresponding ordered sequence of path tracing interface identifiers, based on telemetry-derived associations between egress interfaces corresponding to hops of the expected protocol-based path and respective path tracing interface identifiers;

detecting a routing anomaly in the network based on a comparison of the ordered sequence of path tracing interface identifiers for each expected protocol-based path against ordered path tracing interface-identifier sequences obtained from the path tracing probes; and causing performance of a mitigation action in the network with respect to the routing anomaly.

* * * * *